United States Patent
Sivertsen

(10) Patent No.: US 9,778,937 B1
(45) Date of Patent: Oct. 3, 2017

(54) METHOD AND IMPLEMENTATION FOR STARTING AND STOPPING THE PLAYING OF MEDIA CONTENT DURING BOOTING PROCESS

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 153 days.

(21) Appl. No.: 14/055,555

(22) Filed: Oct. 16, 2013

(51) Int. Cl.
*G06F 9/44* (2006.01)

(52) U.S. Cl.
CPC .................... *G06F 9/4406* (2013.01)

(58) Field of Classification Search
None
See application file for complete search history.

(56) References Cited

U.S. PATENT DOCUMENTS

| | | | | |
|---|---|---|---|---|
| 5,694,143 | A * | 12/1997 | Fielder et al. | 345/519 |
| 6,564,318 | B1 * | 5/2003 | Gharda et al. | 713/2 |
| 8,502,827 | B1 * | 8/2013 | Herz | G06F 9/4401 345/501 |
| 2007/0060234 | A1 * | 3/2007 | Yamada | A63F 13/10 463/8 |
| 2007/0198971 | A1 * | 8/2007 | Dasu et al. | 717/140 |
| 2012/0017072 | A1 * | 1/2012 | Gillespie | 713/2 |
| 2012/0044351 | A1 * | 2/2012 | Kook | B60K 35/00 348/148 |
| 2012/0079029 | A1 * | 3/2012 | Damola et al. | 709/204 |
| 2014/0363144 | A1 * | 12/2014 | Zhou | G06F 9/4406 386/355 |

OTHER PUBLICATIONS

Dandamundi, Sivarama. (2003) Interrupts. In Fundamentals of Computer Organization and Design (pp. 825-862). New York: Springer-Verlag New York Inc.*

* cited by examiner

*Primary Examiner* — Kim Huynh
*Assistant Examiner* — Joshua Neveln
(74) *Attorney, Agent, or Firm* — Locke Lord LLP; Tim Tingkang Xia, Esq.

(57) ABSTRACT

Certain aspects direct to a computing device, which include a processor, a microcontroller, a random access memory (RAM) having a frame buffer, a video controller configured to read video data from the frame buffer, and a non-volatile memory. The processor, the microcontroller, the RAM, the video controller, and the non-volatile memory are in communication with each other. The non-volatile memory stores an operating system, a media player, and first video data. The processor is configured to load the operating system to the RAM and execute the operating system. While the processor is loading the operating system, the microcontroller is configured to load and execute the media player into the RAM. The media player, when executed by the microcontroller, is configured to read the first video data from the non-volatile memory, and write second video data representing the first video data to the frame buffer.

23 Claims, 6 Drawing Sheets

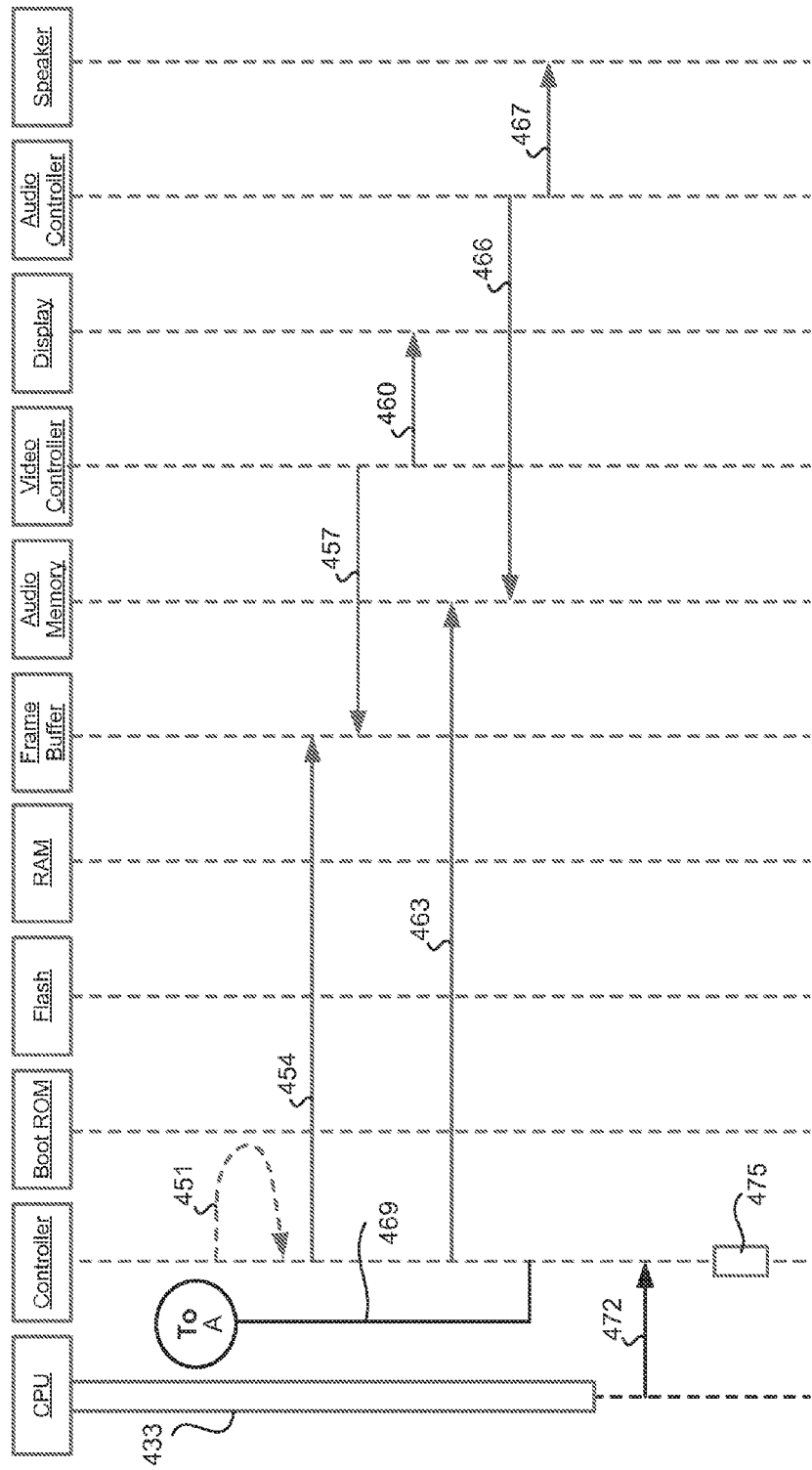

METHOD AND IMPLEMENTATION FOR STARTING AND STOPPING THE PLAYING OF MEDIA CONTENT DURING BOOTING PROCESS

FIELD

The present disclosure generally relates to booting processes of computing devices, and more particularly to techniques of utilizing a microcontroller or a hardware state machine to displaying media content during the booting process of the computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many electronics products today such as smart-phones and smart-TVs have operating systems that require a long time to boot, during which time the user have to wait from the time the power button is pressed until the operating system is fully loaded before some media content can be displayed.

Further, in In-Vehicle Infotainment (IVI) system with a vehicle back camera, it becomes necessary to display the captured video as soon as the vehicle engine and the IVI unit are turned on. Normal BIOS boot and Linux OS or other OS boot can take typically 10-15 seconds or longer. Only after the booting process is completed, the camera display becomes available through a video display application running on the OS. The vehicle user, while backing up after the vehicle engine is on, will have to wait until the OS is booted to see video images captured by the back camera. This is an inconvenience in the current design of IVI.

Therefore, heretofore unaddressed needs still exist in the art to address the aforementioned deficiencies and inadequacies.

SUMMARY

Certain aspects of the present disclosure direct to a computing device. In certain embodiments, the computing device includes a processor, a microcontroller, a random access memory (RAM) having a frame buffer, a video controller configured to read video data from the frame buffer, and a non-volatile memory. The non-volatile memory stores an operating system, a media player, and first video data. The processor, the microcontroller, the RAM, the video controller, and the non-volatile memory are in communication with each other. The processor is configured to load the operating system to the RAM and execute the operating system. The microcontroller is configured to, while the processor is loading the operating system, load and execute the media player into the RAM. The media player is configured to, when executed by the microcontroller, read the first video data from the non-volatile memory, and write second video data representing the first video data to the frame buffer.

In certain embodiments, the first video data is in a first video format, the second video data is in a second video format supported by the video controller, and the media player is configured to convert the first video data to the second video data.

In certain embodiments, the first video data are in a format supported by the video controller, the second video data are the same as the first video data, and the microcontroller is configured to read the first video data from the non-volatile memory and writes the first video data directly to the frame buffer.

In certain embodiments, the non-volatile memory further stores a boot program, the processor is configured to load the boot program into the RAM, and the boot program is configured to, when executed by the processor, initialize the RAM and the video controller.

In certain embodiments, the non-volatile memory further stores an interrupt handler, the microcontroller is configured to load the interrupt handler into the RAM, the operating system, when executed at the processor, is configured to send an interrupt signal to the microcontroller after the operating system has booted, the microcontroller is configured to, in response to receiving the interrupt signal, execute the interrupt handler, and the interrupt handler is configured to instruct the microcontroller to stop executing the media player.

In certain embodiment, the non-volatile memory further stores a converter application that is configured to run on the operating system, wherein the converter application is configured to, when executed by the processor, process a media file in a third video format to generate the first video data, and store the first video data at a first predetermined location of the non-volatile memory.

In certain embodiments, the media player is configured to, when executed by the microcontroller, read video data at the first predetermined location.

In certain embodiments, the non-volatile memory further stores a downloader application that is configured to run on the operating system, and the downloader application is configured to, when executed by the processor, download the media file from a network location.

In certain embodiments, the computing device includes: a display device in communication with the video controller; and an audio controller in communication with a speaker and configured to read audio data from an audio memory space of the RAM, wherein the non-volatile memory further stores first audio data, wherein the media player is configured to, when executed by the microcontroller, read the first audio data from the non-volatile memory, and write second audio data representing the first video data to the audio memory space.

In certain embodiments, the operating system is stored in a first partition of the non-volatile memory, and the media player, the first video data, and first audio data are stored in the second partition of the non-volatile memory.

Certain aspects of the present disclosure direct to a method of booting a computing device, which includes: loading an operating system from a non-volatile memory into a random access memory (RAM) and executing, at a processor, the operating system; while the processor is loading the operating system, loading, by a microcontroller, a media player from the non-volatile memory into the RAM, and executing, at the microcontroller, the media player; reading, by the media player executed at the microcontroller, first video data from the non-volatile memory; and writing, by the media player executed at the microcontroller, second video data representing the first video data to a frame buffer of the RAM, wherein a video controller is configured to read video data from the frame buffer.

In certain embodiments, the method further includes: converting, by the media player, the first video data in a first video format to the second video data in a second video format supported by the video controller.

In certain embodiments, the first video data are in a format supported by the video controller, the second video data are the same as the first video data, and the first video data is directly written to the frame buffer.

In certain embodiments, the method further includes: loading a boot program from the non-volatile memory into the RAM, and executing, at the processor, the boot program; and initializing, by the boot program, the RAM and the video controller.

In certain embodiments, the method further includes: loading an interrupt handler from the non-volatile memory into the RAM; sending, by the operating system executed at the processor, an interrupt signal to the microcontroller after the operating system has booted; in response to receiving the interrupt signal, executing, at the microcontroller, the interrupt handler; and instructing, by the interrupt handler, the microcontroller to stop executing the media player.

In certain embodiments, the method further includes: loading a downloader application from the non-volatile memory to the RAM, and executing, at the processor, the downloader application on the operating system; downloading, by the downloader application executed at the processor, a media file in a third video format from a network location; loading a converter application from the non-volatile memory into the RAM, and executing, at the processor, the converter application on the operating system; processing, by the converter application, the media file to generate the first video data; and storing, by the converter application executed at the processor, the first video data at a first predetermined location of the non-volatile memory.

In certain embodiments, the method further includes: reading, by the media player executed by the microcontroller, video data at the first predetermined location.

In certain embodiments, the method further includes: reading, by the media player executed at the microcontroller, first audio data from the non-volatile memory; and writing, by the media player executed at the microcontroller, second audio data representing the first audio data to an audio memory space of the RAM, wherein an audio controller is configured to read audio data from the audio memory space.

Certain aspects of the present disclosure direct to a non-transitory computer readable medium storing computer executable codes for booting a computing device, wherein the codes are configured to: load an operating system from a non-volatile memory into a random access memory (RAM) and execute, at a processor, the operating system; while the processor is loading the operating system, load, by a microcontroller, a media player from the non-volatile memory into the RAM, and execute, at the microcontroller, the media player; read, by the media player executed at the microcontroller, first video data from the non-volatile memory; and write, by the media player executed at the microcontroller, second video data representing the first video data to a frame buffer of the RAM, wherein a video controller is configured to read video data from the frame buffer.

In certain embodiments, the first video data is in a first video format, the second video data is in a second video format supported by the video controller, and the media player is configured to convert the first video data to the second video data.

In certain embodiments, the first video data are in a format supported by the video controller, the second video data are the same as the first video data, and the microcontroller is configured to read the first video data from the non-volatile memory and writes the first video data directly to the frame buffer.

In certain embodiments, the codes include an interrupt handler, wherein the microcontroller is configured to load the interrupt handler into the RAM, wherein the operating system, when executed at the processor, is configured to send an interrupt signal to the microcontroller after the operating system has booted, wherein the microcontroller is configured to, in response to receiving the interrupt signal, execute the interrupt handler, and wherein the interrupt handler is configured to instruct the microcontroller to stop executing the media player.

In certain embodiments, the codes include a downloader application and a converter application that are configured to run on the operating system. The downloader application is configured to, when executed by the processor, download a media file in a third video format from a network location. The converter application is configured to, when executed by the processor, process the media file to generate the first video data, and store the first video data at a first predetermined location of the non-volatile memory.

In certain embodiments, the media player is configured to, when executed by the microcontroller, read video data at the first predetermined location.

In certain embodiments, the codes are further configured to read, by the media player executed at the microcontroller, first audio data from the non-volatile memory; and write, by the media player executed at the microcontroller, second audio data representing the first audio data to an audio memory space of the RAM, wherein an audio controller is configured to read audio data from the audio memory space.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIGS. 4A and 4B schematically illustrate a process of the operations of the computing device 100 in accordance with certain embodiments of the present disclosure.

DETAILED DESCRIPTION

Figure 1:
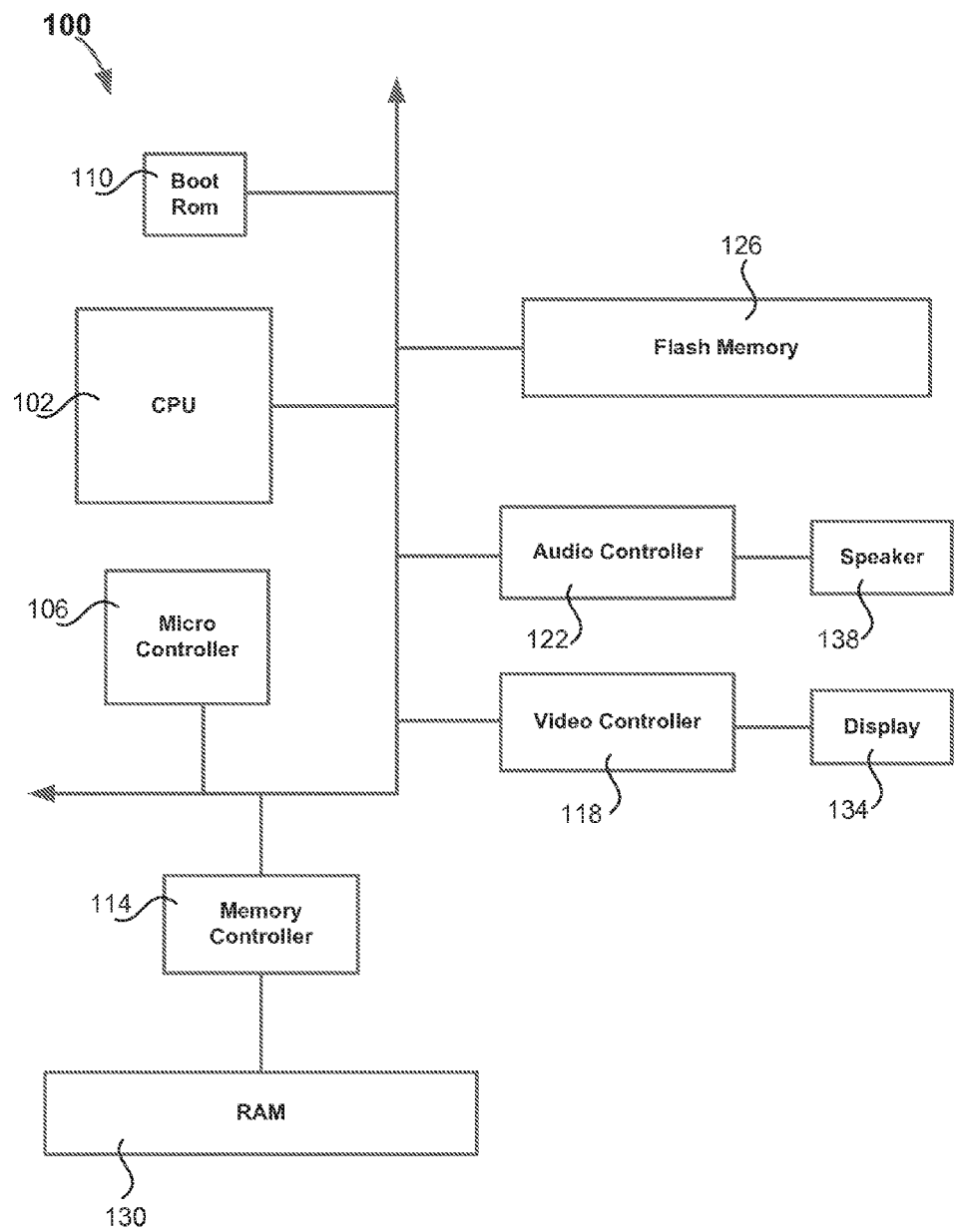
FIG. 1 schematically illustrates a computing device 100 in accordance with certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

FIG. 1 schematically illustrates a computing device 100 in accordance with certain embodiments of the present disclosure. The computing device 100 can be any kind of computing device such as a desktop computer, a laptop computer, a tablet computer, a smart phone, a smart TV, etc. In certain embodiments, the computing device 100 includes a CPU 102, a microcontroller 106, a boot rom 110, a memory controller 114, the video controller 118, an audio controller 122, and a non-volatile memory (such as a flash memory) 126, which are in communication with each other through a system bus 116. Further, the memory controller 114 controls access to a random access memory (RAM) 130. The video controller 118 is in communication with a display device 134. The audio controller 122 is in communication with a speaker 138. The computing device 100 can include other physical or virtual components not shown in FIG. 1.

The CPU 102 can be any suitable types of processors such as an INTEL X86 processor, an INTEL ATOM processor, or an ARM processor, or other microcontrollers.

The microcontroller 106 can be any suitable types of microcontrollers. In certain embodiments, the microcontroller 106 can be configured to read and execute code from a preset location of the flash memory 126. For example, a loader program, which can load additional code, can be placed at the preset location. Further, the microcontroller 106 can receive an interrupt signal. After receiving the interrupt signal, the microcontroller 106 can halt execution of its current code and execute code contained in an interrupt handler.

In certain embodiments, a hardware state machine can be used in place of the microcontroller 106.

In certain embodiments, the boot rom 110 contains the initial code that the CPU 102 executes after a power-on or reset. For example, the initial code can include necessary code and configurations to initialize the flash memory 126. Then, the initial code can instruct the CPU 102 to load a boot program 308 from a predetermined location in the flash memory 126. In certain embodiments, the boot rom 110 can be a small piece of mask ROM or write-protected flash embedded inside the processor chip, an EPROM, etc.

Figure 2:
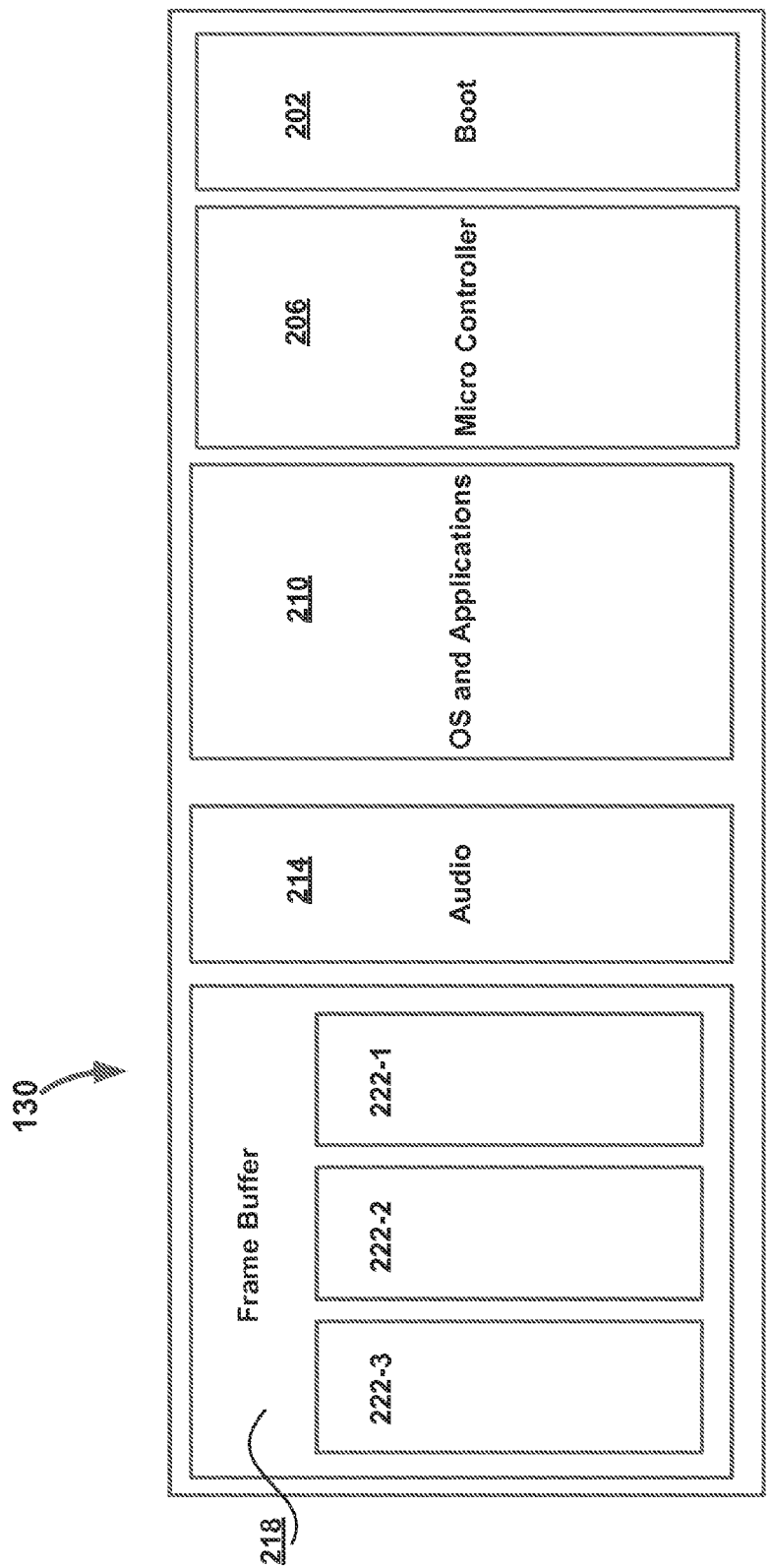
FIG. 2 schematically illustrates a RAM configured in accordance with certain embodiments of the present disclosure.

FIG. 2 schematically illustrates a RAM 130 configured in accordance with certain embodiments of the present disclosure. The memory controller 114 and the RAM 130 can be any suitable types, such as DDR3. The RAM 130 has a boot memory space 202 that is utilized by the boot program 308, a controller memory space 206 that is utilized by a media player 338, and a kernel and user 210 space that is utilized by an operating system 312 and other applications (e.g., a converter application 316) on the operating system 312. In addition, the RAM 130 can have a audio memory space 214. The audio memory space 214 can be accessed by the CPU 102, the microcontroller 106, and the audio controller 122. Further, the RAM 130 can have a frame buffer 218 that has one or more graphic planes 222. In certain embodiments, a graphic plane 222-3 of the graphic planes 222 can be a Graphic Sprite Plane. The frame buffer 218 can be accessed by the CPU 102, the microcontroller 106, and the video controller 118.

Figure 3:
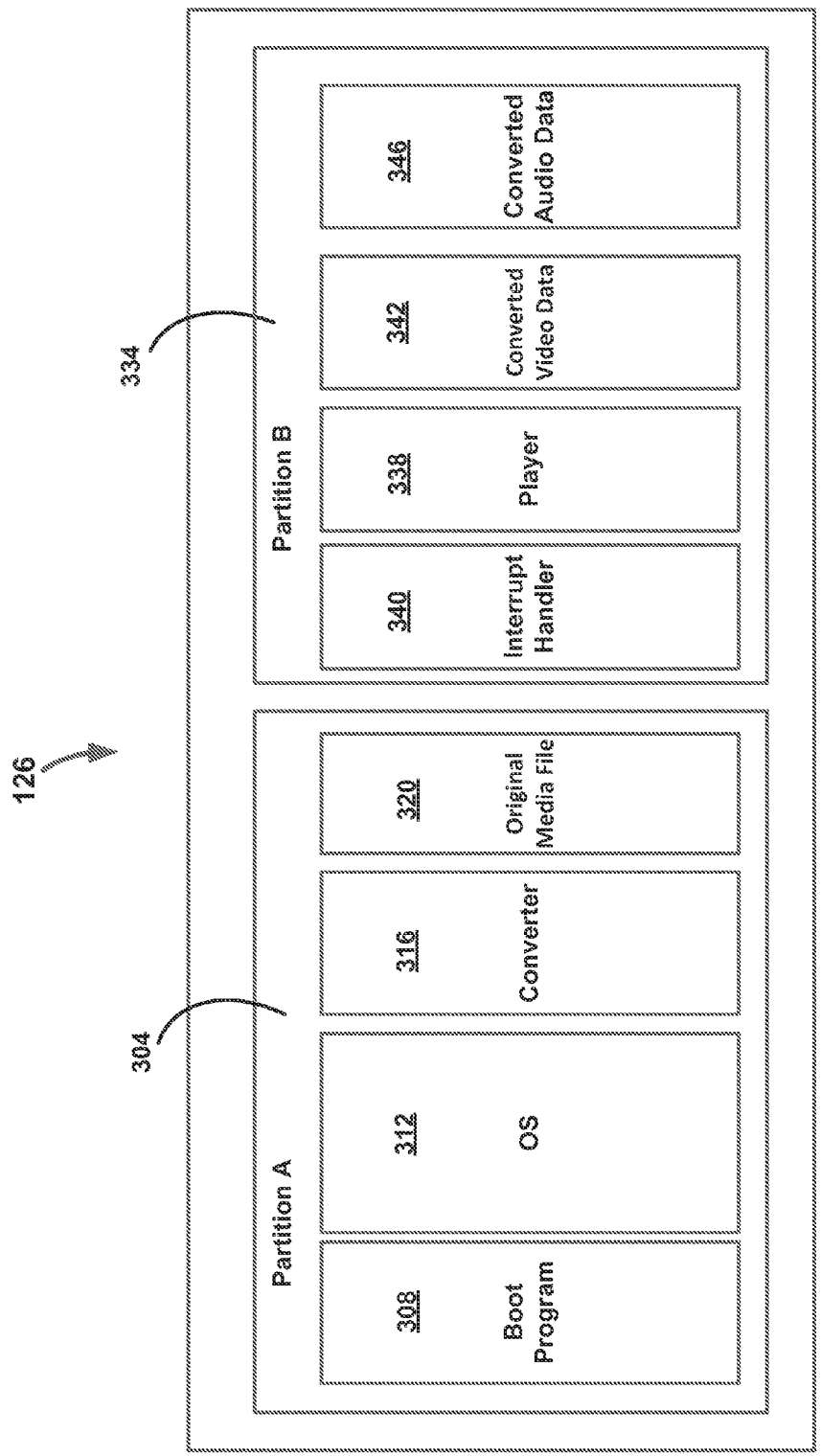
FIG. 3 schematically illustrates a non-volatile memory in accordance with certain embodiments of the present disclosure.

FIG. 3 schematically illustrates a non-volatile memory 126 such as a flash memory or a hard drive in accordance with certain embodiments of the present disclosure. The flash memory 126 is used here as an example. The flash memory 126 can have a partition A 304 and a partition B 334.

The partition A 304 can contain, at a predetermined location (address), the boot program 308. The partition A 304 also includes an operating system 312 (or kernel), a converter application 316, and other applications (not shown).

The boot program 308 includes code and configurations that, when executed by the CPU 102, can test and initialize some or all of the components of the computing device 100. Further, the boot program 308 includes code and configurations that, when executed by the CPU 102, can detect a bootable device, an active partition of the bootable device, and an operating system of the active partition.

The operating system 312 can be collective management software managing the operation and resources of the computing device 100. For example, the operating system 312 can include a set of functional programs that control and manage operations of the devices connected to the CPU 102. The set of application programs provide certain utility software for the user to manage the computing device 100. In certain embodiments, the operating system is operable to multitask, i.e., execute computing tasks in multiple threads, and may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP operating system, APPLE's MACINTOSH OSX operating system, LINUX operating system, UNIX operating system, etc.

In certain embodiments, the operating system 312, when booted, can launch one or more applications. For example, a downloader application can periodically download one or more media files from a network location and then store the media files in this original file format in the partition A 304. Those media files are referred to as original media files.

The original media file 320 can be stored in the partition A 304 manually, or can be downloaded by an application of the computing device 100 from a network location to the partition A 304. The original media file 320 can be in any video formats such as YUV 4:2:2.

The converter application 316 can, when executed by the CPU 102, convert the original media file 320 into converted video data 342 and converted audio data 346, which collectively can be used to display the media content of the original media file 320. The converted video data 342 is in a converted video format. The converted video format can be a format that is supported by the video controller 118 such as RGB 8:8:8 or raw format. The video format of the converted video data 342 can alternatively be a format that is optimized for the microcontroller 106 to further process the converted video data 342 to generate data in the format (e.g., raw format) that can be directly used by the video controller 118. Further, the converted video data 342 is generated using a frame rate that is in accordance with the frame rate of the media player 338 as described below. For example, the frame rate can be about 30 frames per second. In other words, for example, for a video to be played for one second, the converted video data 342 can contain 30 sections of data, where each section of data specifies the pixel values for one video frame.

In certain embodiments, the converted audio data 346 are used to generate the audio accompanying the video content of the converted video data 342. The converted audio data 346 can be divided into multiple sections each containing audio data for a predetermined time. For example, the time period can be one second or ⅓₀ second.

Further, the converter application 316 can store the converted video data 342 in the partition B 334 at a preset location where the media player 338 is configured to access as described below.

The partition B 334 can contain a loader program, a media player 338, an interrupt handler 340, the converted video data 342 and the converted audio data 346 saved by the converter application 316. In certain embodiments, when necessary the loader program can be located at a preset location of the partition B 334 from where the microcontroller 106 is configured to load the initial code after being reset. The loader program, when executed by the microcontroller 106, can load the media player 338 into the RAM 130.

The media player 338, when executed by the microcontroller 106, can read video frame data from the converted video data 342 in the partition B 334 of the flash memory 126 and write the frame data to the frame buffer 218 of the RAM 130. In certain embodiments, the media player 338 can read and write the video frame data in a predetermined frame rate such as 30 frames per second. In other words, every ⅓₀ of a second, the media player 338 reads data of one video frame, processes the data when necessary, and then writes the data to the frame buffer. In certain embodiments, the media player 338 is configured with the size (bytes) of the data for one frame and the starting location of the converted video data 342 in the partition B 334. Thus, the media player 338 can read at the starting location the number of bytes data specifying one video frame, and record the ending location. After ⅓₀ of a second, the media player 338 can read the number of bytes data specifying the subsequent video frame from the location immediately after the ending location.

In certain embodiments, when the converter application 316 converts the original media file 320 to the converted video data 342 in a format supported by the video controller 118, the media player 338 can be configured to instruct the microcontroller 106 to read the converted video data from the partition B 334 and then writes the converted video data 342 directly to the frame buffer 218. In other words, the media player 338 does not need to further process the converted video data 342.

In certain embodiments, the media player 338 reads a section of audio data from the converted audio data 346 stored in the partition B 334. The media player 338 can, when necessary, process the section of audio data to generate audio data supported by the audio controller 122 and write those data to the audio memory space 214. The section of audio data can specify the audio for the entire duration of the media content or a predetermined time period such as one second. The media player 338 writes the video data and audio data to the frame buffer 218 and the audio memory space 214, respectively, in a synchronized manner. This way, the video played at the display device 134 and the audio played at the speaker 138 are synchronized as required by the media content of the original media file 320.

In certain embodiments, the microcontroller 106 loads the interrupt handler 340 into the RAM 130. Therefore, when the microcontroller 106 receives an interrupt signal, it halts the execution of the media player 338, and executes the interrupt handler. The interrupt handler can instruct the microcontroller 106 to exit execution of the media player 338.

Figure 4A:
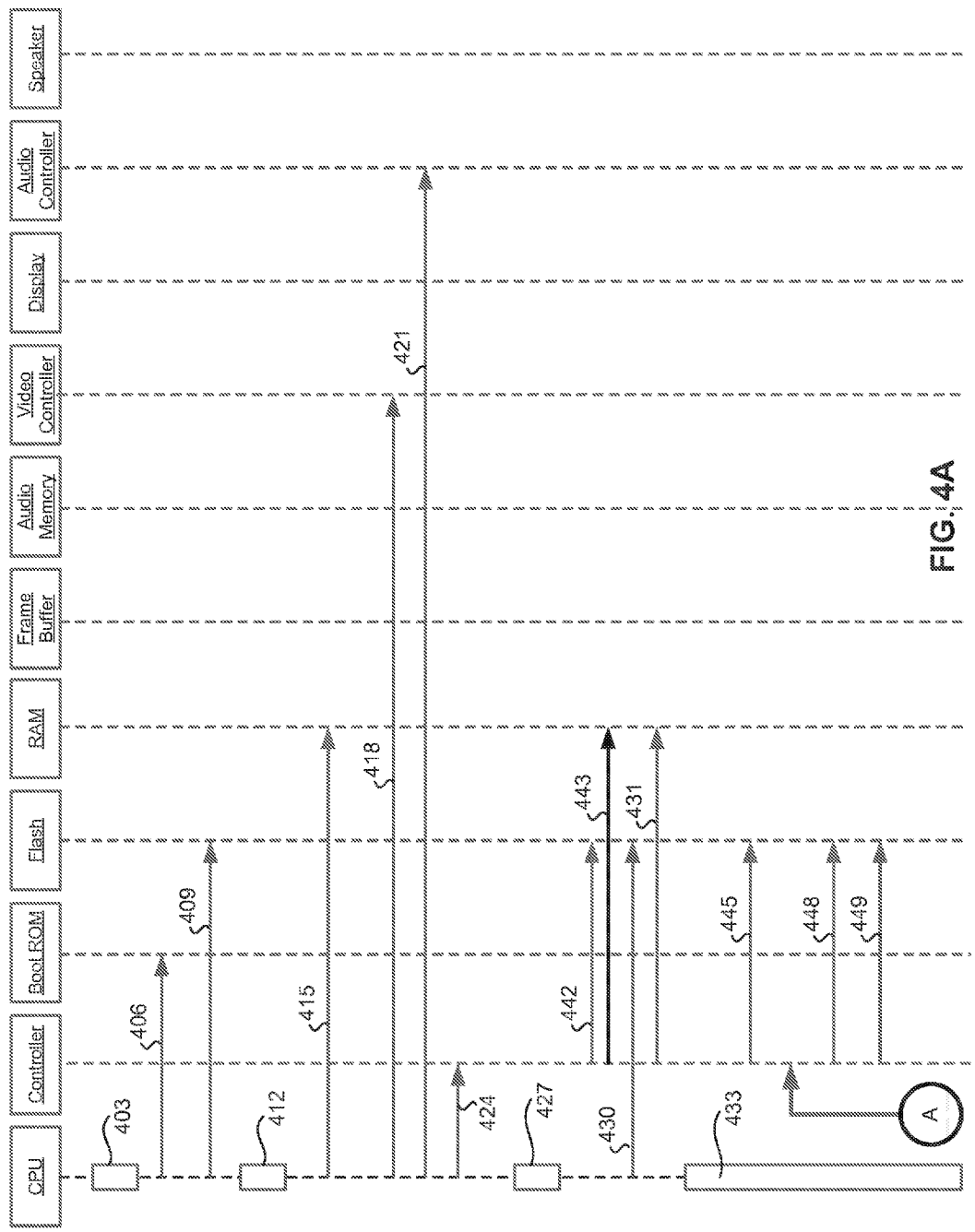

FIGS. 4A and 4B schematically illustrate a process of the operations of the computing device 100 in accordance with certain embodiments of the present disclosure. At operation 403, the CPU 102 is reset or powered on. In certain embodiments, the CPU 102 can be configured to initially load code and configurations stored in the boot rom 110. Thus, at operation 406, the CPU 102 loads and executes the code and the configurations stored in the boot rom 110. The code and the configurations, when necessary, can initialize the flash memory 126. Therefore, the CPU 102 can access the flash memory 126. At operation 409, the code and the configurations can load the boot program 308 from a preset location of the partition A 304 of the flash memory 126. The boot program 308, at operation 412, starts a booting process. For example, at operation 415, the boot program 308 can initialize the memory controller 114 and the RAM 130. The boot program 308 can configure the memory spaces as described above.

At operation 418, the boot program 308 can initialize the video controller 118. At operation 421, the boot program 308 can initialize the audio controller 122. At operation 424, the boot program 308 can reset the microcontroller 106 and, if necessary, initialize the microcontroller 106.

At operation 427, the boot program 308 continues testing and initializing the other components on a chipset or a motherboard of the computing device 100. Therefore, the boot program 308 brings the hardware of the computing device 100 to at least a basic operable state. At operation 430 and operation 431, the boot program 308 detects a bootable partition for loading an operating system. The boot program 308 detects that the partition A 304 of the flash memory 126 is the bootable partition. Then, the boot program 308 loads a loader program of the operating system 312 from the flash memory 126 into the RAM 130. At operation 433, the CPU 102 executes the loader program, which in turn loads and boots the operating system 312 in a non-graphics and non-audio mode. In other words, during the OS booting process, the operating system 312 does not write graphic data or audio data to the frame buffer 218 or the audio memory space 214.

On the other hand, once the microcontroller 106 is reset, it loads and executes, at operation 442 and 443, code and configurations from a preset location of the flash memory 126. When necessary, the code and configurations are loaded into the RAM 130. (The microcontroller 106 can be replaced by a hardware state machine, which does not need a supporting RAM.) Using the example of the microcontroller 106, it can load a loader program from the partition B 334 of the flash memory 126 into the controller memory space 206 of the RAM 130. The loader program, when executed by the microcontroller 106, can load the media player 338 from the partition B 334 into the RAM 130 at operation 445.

At operation 448, the media player 338 fetches, into the controller memory space 206, video data of a video frame from the location of the partition B 334 where the converted video data 342 is stored. In certain embodiments, the fetched frame data may not in a format that can be directly used by the video controller 118. At operation 449, similarly the media player 338 fetches, into the controller memory space 206, a section of the converted audio data from the partition B 334.

At operation 451, the media player 338 processes the fetched frame data and converts them into a format that is supported by the video controller 118. For example, the media player 338 can convert the fetched frame data into a raw format. Similarly, the media player 338 processes the fetched audio data and converts them into a format that is supported by the audio controller 122.

At operation 454, the media player 338 writes the converted frame data to the frame buffer 218. At operation 457, the video controller 118 reads the converted frame data from the frame buffer 218. At operation 460, the video controller 118 generates video signals in accordance with the converted frame data and outputs the video signals to the display device 134.

Concurrently or at substantially the same time with operation 454, the media player 338 writes the converted audio data to the audio memory space 214. At operation 466, the audio controller 122 generates audio signals in accordance with the converted audio data. At operation 467, the audio controller 122 outputs the audio signals to the speaker 138.

At operation 469, the media player 338, when necessary waits for a period of time, reenters operation 448 at the configured frame rate (e.g., 30 frames per second) to fetch the frame data of the next frame.

At operation 472, the OS at the CPU 102 finishes the booting process and then can send an interrupt to the microcontroller 106. Once received the interrupt, the microcontroller 106 can execute the interrupt handler 340, which instructs the microcontroller to stop execution of the media player 338.

Figure 5:
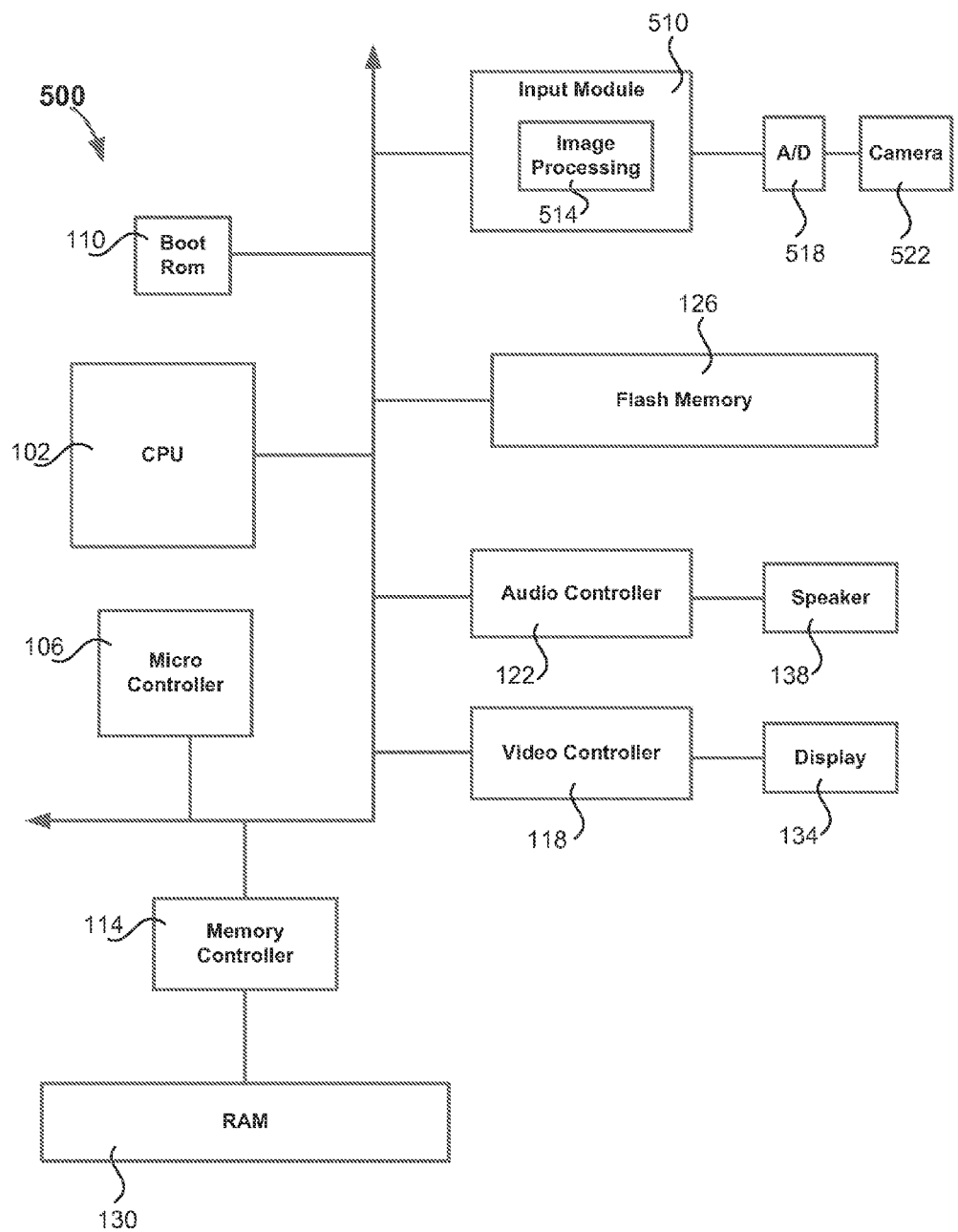
FIG. 5 schematically illustrates a video display system installed on a vehicle.

FIG. 5 schematically illustrates a video display system 500 installed on a vehicle. In addition to similar components of the computing device 100 as shown in FIG. 1, the video display system 500 can also include a camera 522, an A/D converter 518, a video input module 510, and an image processing module 514. The camera 522 can be installed at the backside of the vehicle and capture images or videos of the space behind the vehicle. The camera 522 is in communication with the A/D converter 518 and transmits the analog video signals to the A/D converter 518. The A/D converter 518 can convert the analog signals to any desired digital format such as the 8-bit ITU-R BT.656 interface standard. ITU-R BT.656 builds upon the 4:2:2 digital video encoding parameters defined in ITU-R Recommendation BT.601, which provides interlaced video data, streaming each field separately, and uses the YCbCr (YUV) color space and a 13.5 MHz sampling frequency for pixels. The A/D converter 518 is in communication with the video input module 510. The A/D converter 518 typically generates interlaced video signals. The A/D converter 518 can be connected with the video input module 510 through, for example, a coaxial cable.

The video input module 510 can have an image processing module 514 that can process the received interlaced video signal from the A/D converter 518. The image processing module 514 can decode and de-interlace the received image fields. In other words, the imaging processing module utilizes preconfigured operations or techniques to combine a top image field and a bottom image field received from the A/D converter 518 to generate an image frame. The image frame is represented by pixel values in the camera 522's format and for example in YUV color space. In this example, the YUV image data also has a 4:2:2 sub-sampling rate. That is, the two chroma components are sampled at half the sample rate of luma; the horizontal chroma resolution is halved. In certain embodiments, each of the luma and chrominance components has a value represented by a byte (8-bit). Thus, for the YUV 4:2:2 data, every four bytes represent two pixels. The image processing module 514 accordingly generates video data for each image frame, which can be used for progressive scan display.

Typically, if necessary, the video display system uses a video display application running on an operating system (e.g. Linux) to further process and convert the video frame data in the camera 522's format (e.g. YUV 4:2:2) to video frame data in a format (e.g., BGRA or RGB 8:8:8) that is supported by the video controller 118 of the video display system. The video display application, executed on the CPU 102, can instruct the video controller 118 and a display driver to generate video signals and output the video signals to the display device 134 for displaying the captured video images. Typically, the BIOS and the operating system can take 10-15 seconds to boot up on the CPU 102. Only after the bootup process completes, the video display application can be initiated on the OS and run to display the video images captured by the camera 522. In other words, no images from the camera 522 can be displayed on the display device 134 during the booting process, if the video display system only uses the video display application running on the operating system.

In certain embodiments, the video display system can utilize the microcontroller 106 to display on the display device 134 the video frames captured from the camera 522 until the operating system is booted and able to run the video display application. The boot program 308 can be configured to boot the operating system in a non-graphic, non-audio mode.

In certain embodiments, the video controller 118 may not support the video format of the camera 522. For example, the video controller 118 may not support video frame data in the format (e.g. YUV 4:2:2) received from the camera 522 and the video input module 510, but only supports video data in some other video formats (e.g. RGB 8:8:8). In these circumstances, the video display system can utilize the microcontroller 106 convert the video frame data from the camera 522 to a format that is supported by the video controller 118.

As described above, after power on or reset, the CPU 102 loads the boot program 308. The boot program 308 can configure a capture memory in the RAM 130 for storing video frame data received from the image processing module 514. The size of the capture memory is configured to be sufficient to store video data for a single frame. For example, video data for a frame having 720×480 pixels and in YUV 4:2:2 format roughly have 700 KBytes. Accordingly, the size of the capture memory is set to be about 700 KBytes to 1 Mbytes.

The boot program 308 also detects the location of the operating system loader program in one or more storage devices of the video display system. Upon detecting the OS loader program, the boot program 308 loads the OS loader program from a storage device and then transfer control of the CPU to the OS loader program. Subsequently, the OS loader program starts loading the OS from the storage device into the memory and transfer control of the CPU to the OS. In the meantime, the boot program issues a reset to the microcontroller 106.

In certain embodiments, upon reset, the microcontroller 106 loads and executes the media player 338 as described above. Then, the media player 338 establishes communication with the video input module 510 through the system bus 116. The video input module 510 transmits the video frame data generated by the image processing module 514 to the microcontroller 106, which in turn transmits the data to memory controller 114 and instructs the memory controller 114 to write the video frame data in the capture memory.

In an example, the image processing module 514 receives a top image field and a bottom image field transmitted in accordance with NTSC at 29.97 frames or 59.94 fields per second. After the image processing module 514 de-interlaces a pair of top and bottom image fields and generates data for a image frame, the image processing module 514 instructs the video input module 510 to the microcontroller 106. In other words, in this example, roughly about every 32 ms the memory controller 114, through the microcontroller 106, receives video data of a image frame from the video input module 510 and writes the video data to the capture memory.

After the video input module 510 has completed transferring the image frame data to the capture memory, the media player 338 can process the image data frame data in the capture memory.

As stated above, the format of the video frame data (e.g. YUV 4:2:2) may not be supported by the video controller 118. The media player 338 can convert the video frame data in the camera 522's format (e.g. YUV 4:2:2) stored in the capture memory (which are received from the video input module 510) into video frame data in a format (e.g. RGB 8:8:8) supported by the video controller 118.

The media player 338 can use the floating-point calculation to convert the video frame data in the camera 522's format to the video frame data in the video controller 118's format. For example, if the camera 522's format is YUV 4:2:2 and the video controller 118's format is RGB 8:8:8, the pixel values represented in YUV color space can be converted to pixel values represented in RGB color space using the below equation.

$$\begin{bmatrix} R \\ G \\ B \end{bmatrix} = \begin{bmatrix} 1.164 & 0 & 1.596 \\ 1.164 & -0.391 & -0.813 \\ 1.164 & 2.018 & 0 \end{bmatrix} \left( \begin{bmatrix} Y \\ U \\ V \end{bmatrix} - \begin{bmatrix} 16 \\ 128 \\ 128 \end{bmatrix} \right)$$

In certain embodiments, the microcontroller 106 can support single-instruction, multi-data (SIMD) instructions. The media player 338 accordingly uses the SIMD instructions to convert the video frame data from one format to another. Typically for a microcontroller supporting SIMD instructions, the processor has multiple SIMD registers that each can be divided into blocks having a predetermined number of bytes (or bits) on which computation can be simultaneously operated. For example, a SIMD register can be a 64-bit register; and computations with this register can operate simultaneously on two four-byte values, four two-byte values, or eight single bytes. Accordingly, the media player 338 can use SIMD instructions to instruct the microcontroller 106 to load values of 4 pixels in YUV 4:2:2 format stored in the capture memory, i.e. 64 bits, into a single SIMD register. Then, computations can operate simultaneously on 8 single byte blocks to generate values of the 4 pixels in RGB 8:8:8 format, i.e. 128 bits, which are temporarily stored in one or more SIMD registers. Subsequently, the media player 338 instructs the microcontroller 106 to write the pixel values in RGB format to a memory area that is designated to and accessible by the video controller 118 (i.e., the frame buffer 218).

As described above, the media player 338 instructs microcontroller 106 to convert the frame data stored in the capture memory to frame data in a format supported by the video controller 118. Subsequently, the microcontroller 106 writes the converted pixel values to the frame buffer 218. The frame buffer 218 may have multiple planes such as Planes A, B, and C 222. In this example, the media player 338 instructs the CPU to write the converted pixel values into one of the planes such as Plane A 222-1.

In certain embodiments, the frame buffer 218 can be easily accessible, and data can be directly written into the frame buffer 218 using 32-bit BGRA (BLUE, GREEN, RED, ALPHA) format.

Further, the video controller 118 is configured to read data, through system bus 116, from the frame buffer 218. Thus, video controller 118 can retrieve the converted image data from the frame buffer 218, process the converted image data, and further utilize a display driver to generate video output signals based on the converted image data. In this manner, a display device 134 connected with the output of the display driver can display the video images captured by the camera 522 in accordance with the video signals output by the display driver.

In certain embodiments, the video controller 118 may support the video camera 522's format. For example, the video controller 118, image processing module 514, and the camera 522 may all support frame data YUV 4:2:2 format. In this instance, it is not necessary to use the media player 338 to convert the video frame data from one format to another. The video input module 510 sends the video frame data generated by the image processing module 514 to the microcontroller 106, which in turn writes the data directly to the frame buffer 218, for example, at the SPRITE C graphic plane 222-3. Further, the video controller 118 is configured to read data, through system bus 116, from the frame buffer 218.

Further, the video input module 510 sends the video frame data generated by the imaging processing module periodically to the microcontroller 106, which accordingly writes the data to the frame buffer 218. For example, the data can be written roughly at about every 32 ms.

Further, video controller 118 can retrieve the video frame data from the frame buffer 218, process the video frame data, and further utilizes a display driver to generate video output signals based on the video frame data.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computing device, comprising:
   a processor;
   a microcontroller;
   a random access memory (RAM) having a frame buffer and an audio memory space, wherein the processor is configured to, under an instruction from a boot program and prior to loading an operating system, allocate a capture memory in the RAM;
   a video controller separate from the microcontroller;
   an audio controller separate from the microcontroller; and
   a non-volatile memory including
      a first partition storing
         an operating system, and
         first audio data; and
      a second partition storing a media player program;
   wherein the microcontroller is configured to, while the processor is loading the operating system:
      communicate with a live image capturing source separate from the computing device to receive first video data of a captured image frame, and store the first video data in the capture memory;
      load from the second partition and execute the media player program;
      read, at the media player program, the first video data from the capture memory, convert the first video data to second video data, and write the second video data to the frame buffer; and
      read, at the media player program, the first audio data from the non-volatile memory, and write second audio data representing the first audio data to the audio memory space;
   wherein the video controller is configured to read the second video data from the frame buffer and to output display signals according to the second video data;
   wherein the audio controller is configured to read the second audio data from the audio memory space and to output audio signals according to the second audio data.

2. The computing device of claim 1, wherein the first video data is in a first video format, wherein the second video data is in a second video format supported by the video controller, wherein a media player executed by the microcontroller is configured to convert the first video data to the second video data.

3. The computing device of claim 1, wherein the first video data are in a format supported by the video controller, wherein the second video data are the same as the first video data, wherein the microcontroller is configured to read the first video data from the non-volatile memory and writes the first video data directly to the frame buffer.

4. The computing device of claim 1, wherein the non-volatile memory further stores a boot program, wherein the processor is configured to load the boot program into the RAM, wherein the boot program is configured to, when executed by the processor, initialize the RAM and the video controller.

5. The computing device of claim 1, wherein the non-volatile memory further stores an interrupt handler,
wherein the microcontroller is configured to load the interrupt handler into the RAM,
wherein the operating system, when executed at the processor, is configured to send an interrupt signal to the microcontroller in response to finishing booting the operating system,
wherein the microcontroller is configured to, in response to receiving the interrupt signal, execute the interrupt handler,
wherein the interrupt handler is configured to instruct the microcontroller to stop reading the first video data and the first audio data.

6. The computing device of claim 1, wherein the non-volatile memory further stores a converter application that is configured to run on the operating system,
wherein the converter application is configured to, when executed by the processor,
process a media file in a third video format to generate the first video data, and
store the first video data at a first predetermined location of the non-volatile memory.

7. The computing device of claim 6, further comprising a media player configured to, when executed by the microcontroller, read video data at the first predetermined location.

8. The computing device of claim 7, wherein the non-volatile memory further stores a downloader application that is configured to run on the operating system,
wherein the downloader application is configured to, when executed by the processor, download the media file from a network location.

9. The computing device of claim 1, comprising
a display device in communication with the video controller; and
a speaker in communication with the audio controller.

10. The computing device of claim 9, wherein the operating system is stored in a first partition of the non-volatile memory,
wherein the first video data, and the first audio data are stored in the second partition of the non-volatile memory.

11. A method of booting a computing device, comprising:
booting, by a processor of the computing device, an operating system, wherein the processor is configured to, under an instruction from a boot program and prior to loading the operating system, allocate a capture memory in a random access memory (RAM) of the computing device, wherein the computing device include a non-volatile memory including (a) a first partition storing the operating system and first audio data and (b) a second partition storing a media player program;
while the processor is booting the operating system:
communicating, at a microcontroller of the computing device, with a live image capturing source separate from the computing device to receive first video data of a captured image frame, and storing the first video data in the capture memory;
loading, at the microcontroller, from the second partition and executing the media player program;
reading, at the media player program, the first video data from the capture memory and converting the first video data to second video data;
writing, at the media player program, the second video data to a frame buffer of the RAM;
reading, at the media player program, first audio data from the non-volatile memory;
writing, at the media player program, second audio data representing the first audio data to an audio memory of the RAM;
reading, by a video controller separate from the microcontroller, the second video data from the frame buffer and outputting display signals according to the second video data; and
reading, by an audio controller separate from the microcontroller, the second audio data from the audio memory space and outputting audio signals according to the second audio data.

12. The method of claim 11, further comprising:
converting, by the microcontroller, the first video data in a first video format to the second video data in a second video format supported by the video controller.

13. The method of claim 11, wherein the first video data are in a format supported by the video controller video, wherein the second video data are the same as the first video data, wherein the first video data is directly written to the frame buffer.

14. The method of claim 11, further comprising:
loading a boot program from the non-volatile memory into the RAM, and executing, at the processor, the boot program; and
initializing, by the boot program, the RAM and the video controller.

15. The method of claim 11, further comprising:
sending, at the processor, an interrupt signal to the microcontroller in response to finishing booting the operating system; and
in response to receiving the interrupt signal, instructing the microcontroller to stop reading the first video data and the first audio data.

16. The method of claim 11, further comprising:
loading a downloader application from the non-volatile memory to the RAM, and executing, at the processor, the downloader application on the operating system;
downloading, by the downloader application executed at the processor, a media file in a third video format from a network location;
loading a converter application from the non-volatile memory into the RAM, and executing, at the processor, the converter application on the operating system;
processing, by the converter application, the media file to generate the first video data; and
storing, by the converter application executed at the processor, the first video data at a first predetermined location of the non-volatile memory.

17. The method of claim 16, further comprising:
reading, by the microcontroller, video data at the first predetermined location.

18. A non-transitory computer readable medium storing computer executable code for booting a computing device, comprising code to
boot, at a processor of the computing device, an operating system, wherein the processor is configured to, under an instruction from a boot program and prior to loading the operating system, allocate a capture memory in a random access memory (RAM) of the computing device, wherein the computing device include a nonvolatile memory including (a) a first partition storing the operating system and first audio data and (b) a second partition storing a media player program;

while the processor is booting the operating system:

communicate, at a microcontroller of the computing device, with a live image capturing source separate from the computing device to receive first video data of a captured image frame, and store the first video data in the capture memory;

load, at the microcontroller, from the second partition and execute the media player program;

read, at the media player program, the first video data from the capture memory and convert the first video data to second video data;

write, at the media player program, the second video data to a frame buffer of the RAM;

read, at the media player program, first audio data from the non-volatile memory;

write, at the media player program, second audio data representing the first audio data to an audio memory of the RAM;

read, at a video controller separate from the microcontroller, the second video data from the frame buffer and output display signals according to the second video data; and read, at an audio controller separate from the microcontroller, the second audio data from the audio memory space and output audio signals according to the second audio data.

19. The non-transitory computer readable medium of claim 18, wherein the first video data is in a first video format, wherein the second video data is in a second video format supported by the video controller, wherein the code is further configured to convert, at the microcontroller, the first video data to the second video data.

20. The non-transitory computer readable medium of claim 18, wherein the first video data are in a format supported by the video controller video, wherein the second video data are the same as the first video data, wherein the code is further configured to write, at the microcontroller, the first video data directly to the frame buffer.

21. The non-transitory computer readable medium of claim 18, wherein the code is further configured to:

send an interrupt signal to the microcontroller in response to finishing booting the operating system, in response to receiving the interrupt signal, instruct the microcontroller to stop reading the first video data and the first audio data.

22. The non-transitory computer readable medium of claim 18, wherein the code comprises a downloader application and a converter application that are configured to run on the operating system, wherein the downloader application is configured to, when executed by the processor, download a media file in a third video format from a network location; and wherein the converter application is configured to, when executed by the processor, process the media file to generate the first video data, and store the first video data at a first predetermined location of the non-volatile memory.

23. The non-transitory computer readable medium of claim 22, wherein the code is further configured to read, at the microcontroller, video data at the first predetermined location.

* * * * *